United States Patent
Asfahani et al.

(10) Patent No.: US 12,347,162 B2
(45) Date of Patent: Jul. 1, 2025

(54) IDENTIFYING AND REMEDIATING OIL SPILLS

(71) Applicants: Saudi Arabian Oil Company, Dhahran (SA); King Abdullah University of Science and Technology, Thuwal (SA)

(72) Inventors: Khaled M. Asfahani, Dhahran (SA); Ali M. Qasem, Dhahran (SA); Alaa A. Elyas, Dhahran (SA); Ibrahim Hoteit, Thuwal (SA); Sabique Langodan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 329 days.

(21) Appl. No.: 17/820,186

(22) Filed: Aug. 16, 2022

(65) Prior Publication Data

US 2024/0062511 A1 Feb. 22, 2024

(51) Int. Cl.
| | | |
|---|---|---|
| G06V 10/62 | (2022.01) | |
| G01S 13/90 | (2006.01) | |
| G06V 10/774 | (2022.01) | |
| G06V 20/10 | (2022.01) | |
| G06V 20/13 | (2022.01) | |

(52) U.S. Cl.
CPC .......... *G06V 10/62* (2022.01); *G01S 13/9021* (2019.05); *G06V 10/774* (2022.01); *G06V 20/13* (2022.01); *G06V 20/194* (2022.01)

(58) Field of Classification Search
CPC ...... G06V 10/62; G06V 10/774; G06V 20/13; G06V 20/194; G01S 13/9021
USPC ........................................................ 382/103
See application file for complete search history.

(56) References Cited

U.S. PATENT DOCUMENTS

| | | | |
|---|---|---|---|
| 7,009,550 B2 | 3/2006 | Moeller-Jensen | |
| 2014/0050355 A1* | 2/2014 | Cobb | G06T 7/0004 |
| | | | 382/103 |
| 2022/0051388 A1* | 2/2022 | Liu | G06T 7/0004 |

FOREIGN PATENT DOCUMENTS

| | | |
|---|---|---|
| CN | 110346795 | 6/2021 |
| KR | 101538668 | 7/2015 |
| KR | 20190133442 | 12/2019 |
| KR | 20200032452 | 3/2020 |

OTHER PUBLICATIONS

Corucci et al., "Oil Spill Classification from Multi-Spectral Satellite Images: Exploring Different Machine Learning Techniques," Remote Sensing of the Ocean, Sea Ice, and Large Water Regions, Oct. 2010, 7825:73-87, 15 pages.

(Continued)

*Primary Examiner* — Ayodeji O Ayotunde
(74) *Attorney, Agent, or Firm* — Fish & Richardson P.C.

(57) ABSTRACT

Systems and methods for identifying an oil spill in a body of water include obtaining an image of the body of water from a multispectral satellite for a first time period and a second time period. One or more features are extracted the from the image to form a first feature vector for the first time period and a second feature vector for the second time period with the one or more features representing a physical feature of a surface of the body of water. The feature vectors are processed using a machine learning model trained with (Continued)

labeled image data representing instances of oil on the surface of the body of water to determine the type and location of oil in the body of water.

20 Claims, 10 Drawing Sheets

(56) References Cited

OTHER PUBLICATIONS

Fan et al., "Oil Spill Monitoring Based on SAR Remote Sensing Imagery," Aquatic Procedia, Mar. 2015, 3:112-8, 7 pages.
Fingas et al., "Review of Oil Spill Remote Sensing," Marine Pollution Bulletin, Apr. 2014, 83(1):9-23, 15 pages.
Leifer et al., "State of the Art Satellite and Airborne Marine Oil Spill Remote Sensing: Application to the BP Deepwater Horizon Oil Spill, Remote Sensing of Environment," Mar. 2012, 124:185-209, 25 pages.
Pisano et al., "An Oceanographic Survey for Oil Spill Monitoring and Model Forecasting Validation Using Remote Sensing and in situ Data in the Mediterranean Sea," Deep Sea Research Part II: Topical Studies in Oceanography, Mar. 2016, 133:132-45, 14 pages.
PCT International Search Report and Written Opinion in International Appln. No. PCT/US2023/029853, dated Nov. 8, 2023, 17 pages.
PCT International Search Report and Written Opinion in International Appln. No. PCT/US2023/029852, dated Nov. 28, 2023, 13 pages.
PCT International Search Report and Written Opinion in International Appln. No. PCT/US2023/029848, dated Nov. 24, 2023, 13 pages.
U.S. Appl. No. 17/820,191, Asfahani et al., Aug. 16, 2022.
U.S. Appl. No. 17/889,230, Asfahani et al., Aug. 16, 2022.
Alpers et al., "Oil spill detection by imaging radars: Challenges and pitfalls," Remote Sensing of Environment, 2017, 201:133-147, 15 pages.
De Kerf et al., "Oil Spill Detection Using Machine Learning and Infrared Images," Remote Sensing, Dec. 2020, 12:4090, 13 pages.
Keramea et al., "Oil Spill Modeling: A Critical Review on Current Trends, Perspectives, and Challenges," Journal of Marine Science and Engineering, Feb. 2021, 9:181, 38 pages.
Prasad et al., "Oil spill trajectory prediction with high-resolution ocean currents," Journal of Operational Oceanography, 2019, 1-16, 17 pages.

* cited by examiner

IDENTIFYING AND REMEDIATING OIL SPILLS

TECHNICAL FIELD

The present disclosure generally relates to identifying, quantifying, and remediating oil spills.

BACKGROUND

Oil spills at sea threaten humans, wildlife, and marine ecosystems. Remote sensing can be used for the detection and the monitoring of oil spills using platforms such as satellites and aircraft. Some passive systems use of sensors that detect reflected or emitted electro-magnetic radiation from natural sources (e.g., visible spectrum light, reflective infrared and thermal infrared). Some active systems detect reflected responses from objects that are irradiated from artificially-generated sources (e.g., radar or laser systems).

SUMMARY

This specification describes systems and methods for identifying and remediating oil spills. This approach combines in situ data, machine learning models, and remote sensing technology.

These systems and methods provide an approach to identifying the type of oil spilled (e.g., heavy, medium, light) as well as the appearance of the spill (e.g., sheen, rainbow, metallic, discontinuous true oil, and continuous true oil) using satellite images rather than portable oil type classifiers and onsite observations. The identified type of oil and appearance of the spill provides the basis for estimating the volume and location of an oil spill, forecasting movement of the oil spill, and guiding remediation efforts.

Some methods for identifying an oil spill in a body of water include: (a) obtaining an image of the body of water from a satellite for a first time period and a second time period; (b) determining one or more features to extract from the image, the features representing a physical feature of a surface of the body of water for each of the first time period and the second time period; (c) extracting the one or more features from the image to form a first feature vector for the first time period and a second feature vector for the second time period; (d) processing the first feature vector and the second feature vector using a machine learning model, the machine learning model being trained with labeled image data representing instances of oil on the surface of the body of water, the labeled image data associating types with portions of the surface of the water body based on the respective instances of the oil in the first and second vectors; (e) determining, based on the processing, the type and location of oil in the body of water; and (f) storing, in a data store, type and locations of oil in the body of water in association with the image.

Some methods for identifying an oil spill in a body of water include: (a) obtaining an image of the body of water from a multispectral satellite for a first time period and a second time period; (c) extracting the one or more features from the image to form a first feature vector for the first time period and a second feature vector for the second time period, the one or more features representing a physical feature of a surface of the body of water; (d) processing the first feature vector and the second feature vector using a machine learning model trained with labeled image data representing instances of oil on the surface of the body of water, the labeled image data associating types of oil with portions of the surface of the water body based on the respective instances of the oil in the first and second vectors; (e) determining, based on the processing, the type and location of oil in the body of water; and (f) storing, in a data store, type and locations of oil in the body of water in association with the image.

These methods can include one or more of the following features.

In some embodiments, obtaining the image of the body of water from the satellite comprises obtaining a synthetic aperture radar image, a multispectral image, or both. In some cases, obtaining the image of the body of water from the satellite includes obtaining both the synthetic aperture radar image and the multispectral image and performing steps (b)-(f) on the synthetic aperture radar image and the multispectral image. In some cases, methods also include: comparing the locations of oil determined based on the synthetic aperture radar image with the locations of oil determined based the multispectral image to assess whether an oil spill has occurred.

In some embodiments, the types of oil include Arabian Heavy, Arabian Medium, Arabian Light, Arabian Extra Light, and Arabian Super Light.

In some embodiments, methods also include assessing the type and location of oil in the body of water to identify possible sources of the oil.

In some embodiments, methods also include sending instructions to at least one vessel in the body of water based on the stored locations of oil in the body of water.

These systems and methods can reduce the time and manpower needed to identify and quantify spills of hydrocarbons in a body of water. This approach can provide a remotely verification method of the oil spill type. These systems also minimizes the response time in the event of oil spills at remote locations.

The term "satellite image" is used to include both visual images as well as data used to represent the geographic distribution of that physical properties as measured by satellite-based sensors.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

This specification describes systems and methods for identifying and remediating oil spills. Combining in situ data, machine learning models, and remote sensing technology, these systems and methods provide an approach to identifying the type of oil spilled (e.g., heavy, medium, light) as well as the appearance of the spill (e.g., sheen, rainbow, metallic, discontinuous true oil, and continuous true oil) using satellite images rather than portable oil type classifiers and onsite observations. The identified type of oil and appearance of the spill provides the basis for estimating the volume and location of an oil spill, forecasting movement of the oil spill, and guiding remediation efforts.

Figure 1:
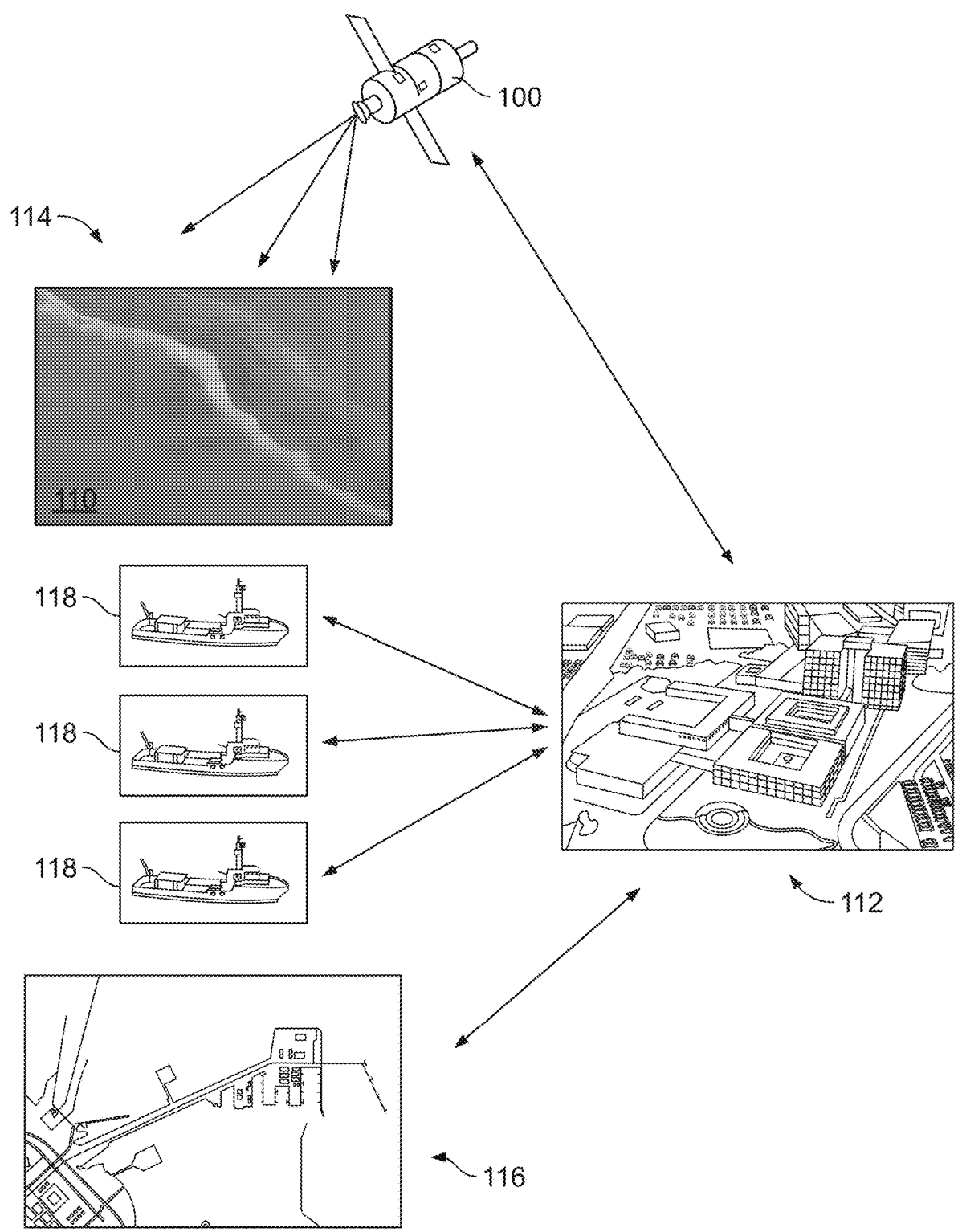
FIG. 1 is a schematic view of illustrating the application of this system for identifying and tracking oil spills.

FIG. 1 is a schematic view of illustrating the application of this approach. A satellite 100 monitoring a body of water 110 transmits images of the body of water 110 to processors in a control center 112. In the event of an oil spill 114, the images of the body of water 110 contain indications of oil on the surface of the body of water 110. The processors in the control center 112 identify the type of oil in the oil spill 112 and the appearance of the spill based on the satellite images, estimate the volume and location of the oil spill 114, and forecast movement of the oil spill 114. The control center 112 sends instructions coordinating remediation efforts to a port 116 and to remediation assets (e.g., oil spill response vessels 118) in the body of water 110. Once the remediation assets are on scene, they gather data in the course of conducting remediation of the oil spill that is communicated back to the control center 112. This on-site data can be used to supplement and confirm the results of the oil identification, volume estimation, and forecasting modules.

Although only a single satellite 100 is shown, typically multiple satellites 100 will be used to monitor the body of water 110. These satellites 100 can include different types of satellites (e.g., synthetic aperture radar (SAR) satellites, and multi-spectrum satellites) as well as multiple satellites of the same type (e.g., multiple SAR satellites as their orbits take them over the body of water).

Figure 2:
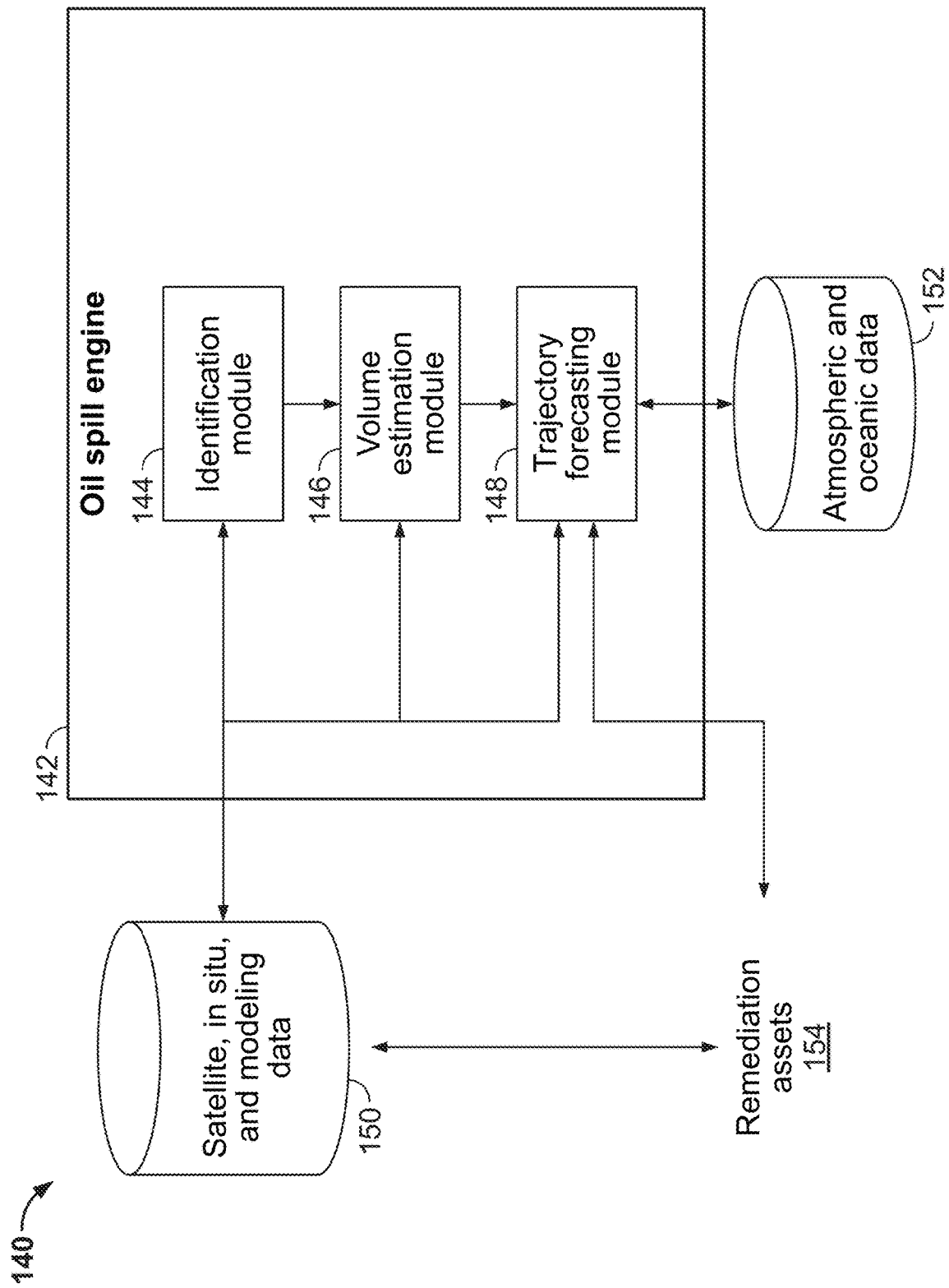
FIG. 2 is a schematic illustrating an example system used to implement processes for identifying and tracking oil spills.

FIG. 2 is a schematic illustrating an example of a system 140 that could be used to implement the processes described in this specification. The communication between modules is described with reference to this figure but the actual implementations of the individual modules are described later in this specification.

The system 140 can be implemented in computer processors located in the control center 112. The system 140 includes an oil spill engine 142 which includes an identification module 144, a volume estimation module 146, and a trajectory forecasting module 148. Although illustrated as part of the oil spill identification and forecasting engine 142, some systems include a separate model or engine for forecasting the trajectory of oil spills being monitored. In these systems, the trajectory forecasting engine is in communication with the oil spill engine 142.

The oil spill engine 142 is in communication with a first data store 150 and a second data store 152. The first data store wire 150 contains data from satellites 100, in situ data reported by on-site remediation assets 154, and data generated by models including, for example, the modules of the oil spill engine 142. The second data store 152 contains atmospheric and oceanic data such as, for example, data associated with tides, currents, waves, and winds in the vicinity of the body of water. Some systems include more or fewer data stores and/or organize input and output data differently.

As discussed above, the satellites 100 monitoring the body of water 110 transmits images of the body of water 110 to processors in the control center 112 where it is stored in the first data store 150 and provided to the identification module 144. The identification module 144 monitors the images of the body of water 110 for indications of oil on the surface of the body of water 110. The identification module 144 includes one or more machine learning models based on historical data associating satellite images with specific types of oil (e.g., Arabian Heavy, Arabian Medium, Arabian Light, Arabian Extra Light, and Arabian Super Light). When the identification module 144 determines that indications of oil are present on the surface of the body of water 110, the identification module 144 processes the satellite images to identify the type and location of the oil as described in more detail with reference to FIG. 4. The results of this process are stored in the first data store 150 and provided to the volume estimation module 146 as input.

The volume estimation module 146 is activated when the identification module 144 is determined that indications of oil are present on the surface of the body of water 110. The volume estimation module 146 includes one or more machine learning models based on historical data associating satellite images with specific appearances of oil on the surface of the body of water 110 (e.g., sheen, rainbow, metallic, discontinuous true oil, and continuous true oil). The volume estimation module 146 receives and processes the satellite images to determine the appearance of the oil as described in more detail with reference to FIG. 6. The appearance of oil on a body of water is associated with the thickness of the oil and can be used to estimate the volume of oil present. The results of this process are stored in the first data store 150 and provided to the trajectory forecasting module 148 as input.

The trajectory forecasting module 148 is activated when trigger criteria (e.g., criteria associated with the volume or location of oil) are exceeded. As currently implemented, the trajectory forecasting module 148 uses satellite images as initial conditions for forecasting the movement of the oil based on hydrodynamic modeling. As described in more detail with respect to FIG. 8, the trajectory forecasting module 148 can reset the current oil location to match observed conditions when new satellite images are available. Some trajectory forecasting module 148 also use the estimated type, volume, and location of oil generated by the identification module 144 and the volume estimation module 146 as input.

In the illustrated system 140, the control center 112 sends instructions coordinating remediation efforts to remediation assets 154 (e.g., the port 116, the oil spill response vessels 118, coast guard, operation facilities, and government regulatory bodies). Once the remediation assets are on scene, they gather data in the course of conducting remediation of the oil spill that is communicated back to the control center 112 (e.g., to the data store 150). This on-site data can be used to supplement and confirm the results of the oil identification, volume estimation, and forecasting modules.

Identifying Oil Spills

Figure 3:
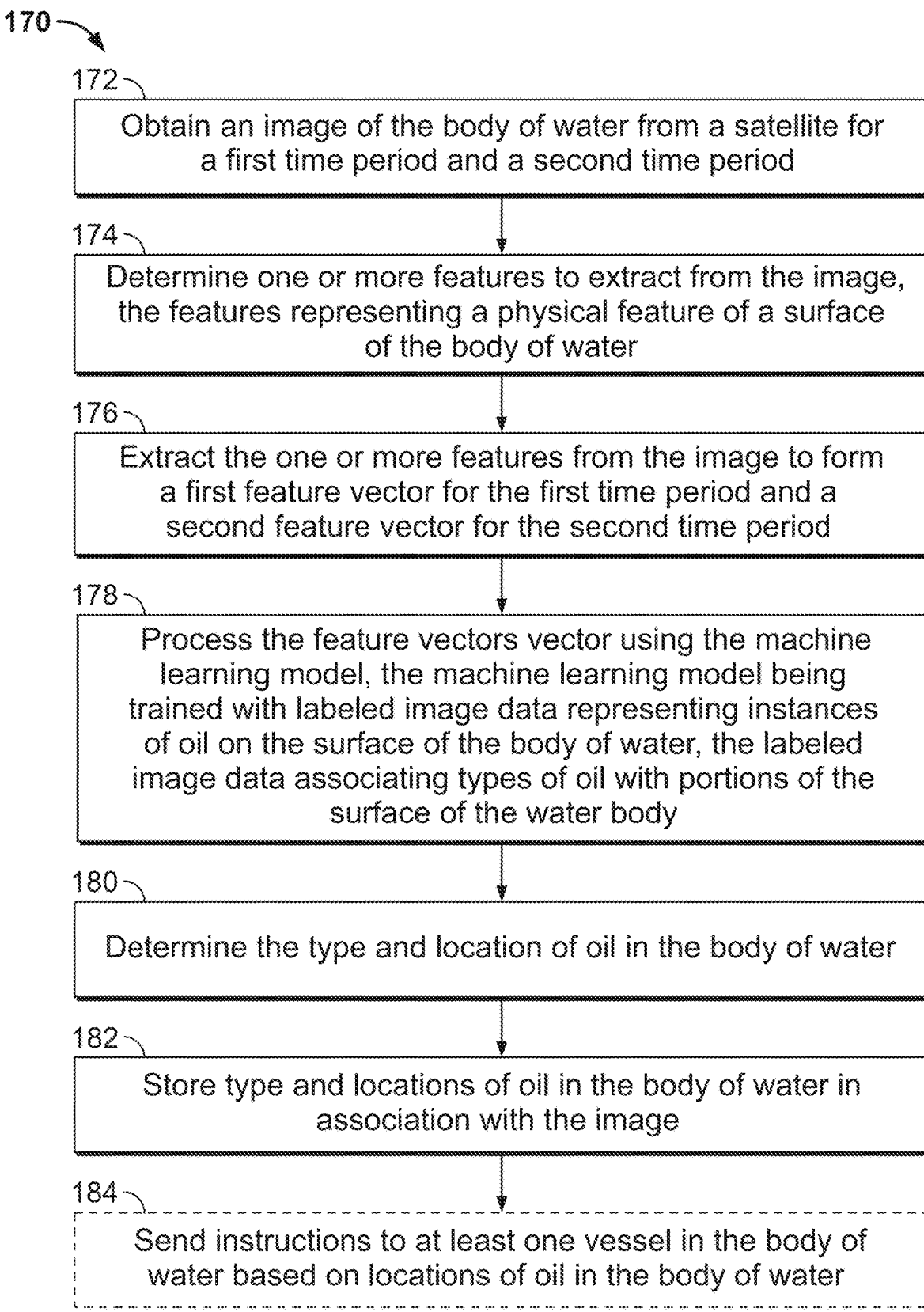
FIG. 3 illustrates an example flow diagram for an identification module of the system of FIG. 2.

FIG. 3 illustrates an example flow diagram for an identification module of the system of FIG. 2. The method 170 is implemented with the identification module 144 monitoring the images of the body of water 110 for indications of oil on the surface of the body of water 110. The identification module 144 includes one or more machine learning models based on historical data associating satellite images with specific types of oil. A prototype of the identification module 144 has been developed using images from SAR and multispectral satellites in conjunction with historic oil spill data. Data from the SAR satellites processed by the machine learning models of the prototype of the identification module 144 include oil slicks expansions caused by the oil spill. Data from the multispectral satellites processed by the machine learning models of the prototype of the identification module 144 include reflection/absorption features of different regions of electromagnetic spectrum. Data from the historic oil spills processed by the machine learning models of the prototype of the identification module 144 include date and time of the oil spill, geographical location and extend of the spill, type of the oil, spilled volume and duration of the spill.

The monitoring process includes obtaining satellite images of the body of water for a first time period and a second time period (step 172). The machine learning models of the identification module 144 determine one or more features to extract from the images (step 174). These features represent physical features of a surface of the body of water for each of the first time period and the second time period. The features are extracted from the images to form a first feature vector for the first time period and a second feature vector for the second time period (step 176).

The identification module 144 includes one or machine learning models trained with labeled image data representing instances of oil on the surface of the body of water in the historic spill data. The labeled image data associates types of oil (e.g., Arabian Heavy, Arabian Medium, Arabian Light, Arabian Extra Light, and Arabian Super Light) with portions of the surface of the water body based on the respective instances of the oil in the first and second vectors. Although the prototype of the identification module 144 was trained on data from the Arabian Gulf, the identification module 144 can be trained on data from other bodies of water where spills of other types of oil.

When the identification module 144 determines that indications of oil are present on the surface of the body of water 110, a machine learning model is applied based on the one or more features included in the first feature vector and the second feature vector. The selected machine learning model processes the first feature vector and the second feature vector (step 178) and determines, based on the processing, the type and location of oil in the body of water (step 180). The results of this process (i.e., type and locations of oil in the body of water) are stored in the first data store 150 in association with the image (step 182).

The type and location of oil determined by the identification module 144 can be assessed to identify possible sources of the oil and facilitate securing facilities or vessels to limit further discharge or oil. In addition, the type and location of oil can be the basis for sending instructions to remediation assets (e.g., oil spill response vessels) in the body of water (step 184). Typically such instructions are based the more complete picture of an unfolding situation provided by the combined results of the identification module 144, the volume estimation module 146, and the trajectory forecasting module 148. However, initial instructions (e.g., requesting vessels get underway towards a possible spill location) are sometimes based on preliminary alerts provided by the various systems.

Although the described identification module 144 uses data from both SAR and multispectral satellites, some identification modules use only a single type of satellite images (i.e., SAR images or multispectral images but not both). In identification modules that use both SAR images and multispectral images, the process of determining the location of oil can be performed using SAR images and the process of determining type and location can be performed using multispectral images. Comparing the SAR-based results with the multispectral-based results can reduce false alarms associated with, for example, high turbid water due to sediment movements, algal blooms.

Figure 4:
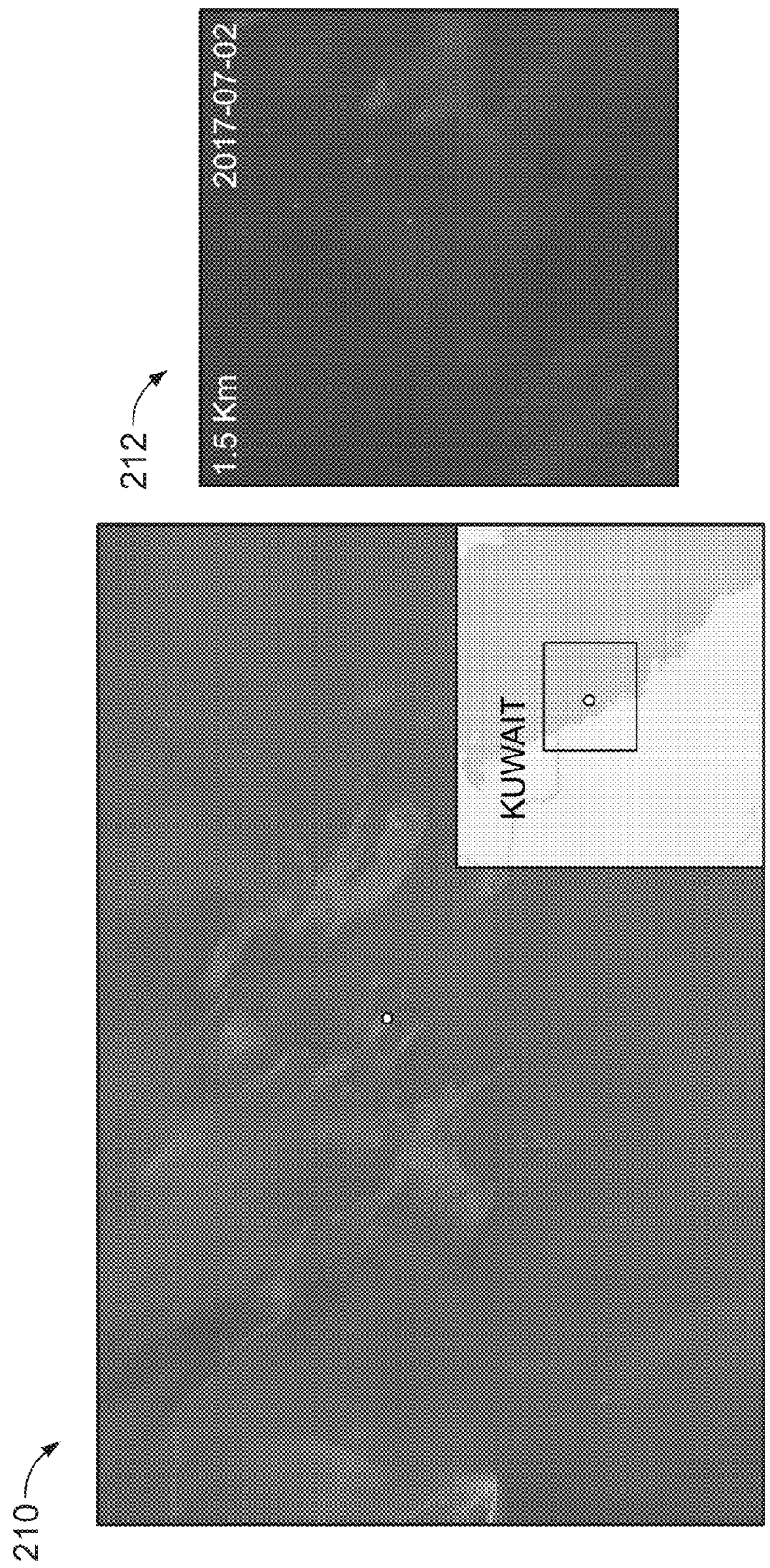
FIG. 4 illustrates results generated by a prototype of an identification module.

FIG. 4 shows example satellite images data 210, 212 from a Sentinel-2 satellite. The initial prototype was developed and run based on the Sentinel-2 multispectral images. A second prototype incorporated SAR images to contribute to oil detection and tracking and increase the detection accuracy while reducing false alarms.

Estimating Volume of Oil Spills

Figure 5:
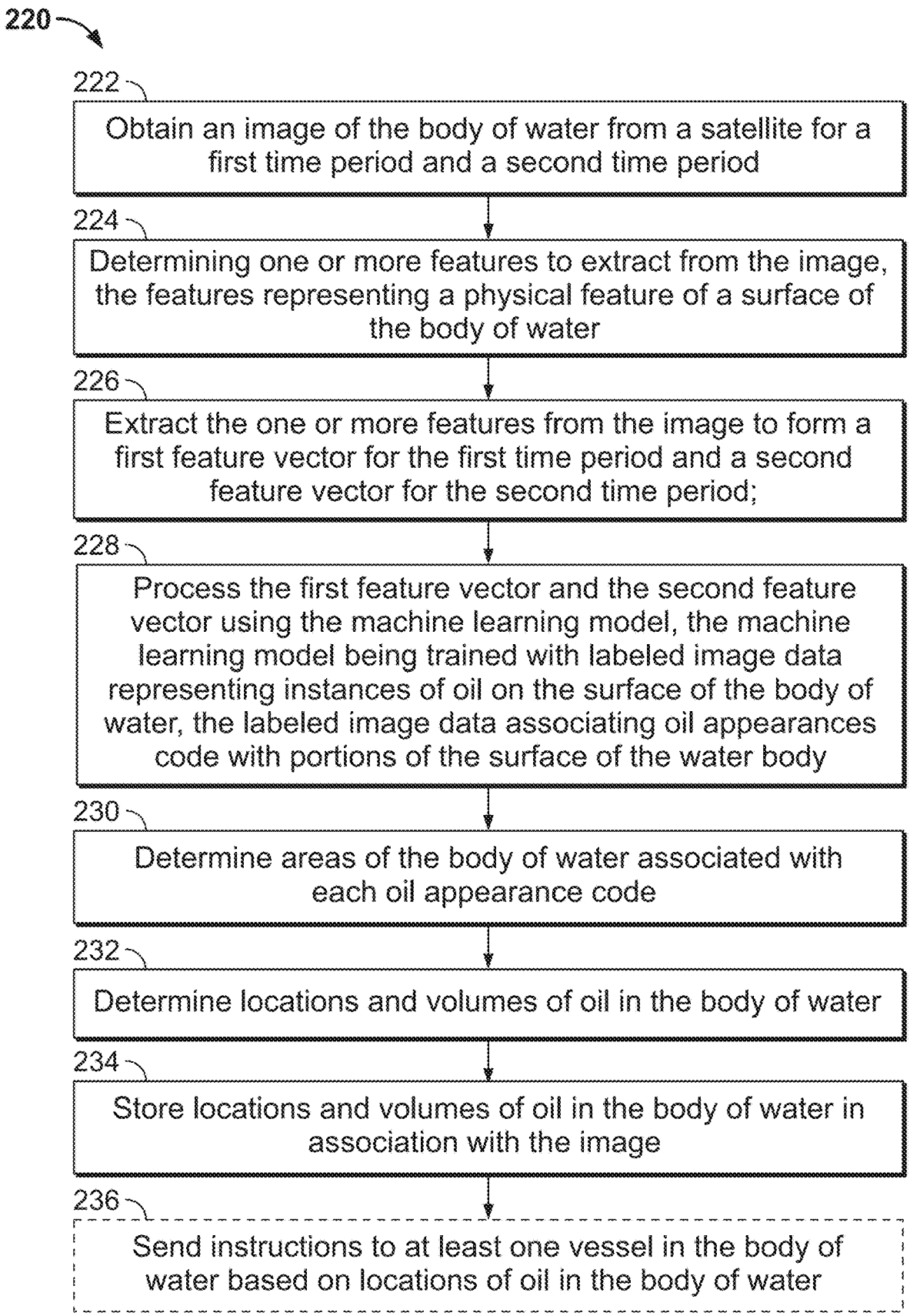
FIG. 5 illustrates an example flow diagram for a volume estimation module of the system of FIG. 2.

FIG. 5 illustrates an example flow diagram for a volume estimation module 146 of the system of FIG. 2. As discussed above, the volume estimation module 146 is activated when the identification module 144 is determined that indications of oil are present on the surface of the body of water 110. The volume estimation module 146 is based on the relationship between the appearance of oil on a body of water with the thickness of the oil.

The method 220 is implemented with the volume estimation module 146 analyzing the images of the body of water 110 to characterize the appearance of oil on the surface of the body of water 110. The volume estimation module 146 includes one or more machine learning models based on historical data associating satellite images with specific appearances of oil on the surface of the body of water 110 (e.g., sheen, rainbow, metallic, discontinuous true oil, and continuous true oil). A prototype of the volume estimation module 146 has been developed using images from SAR and multispectral satellites in conjunction with historic oil spill data.

The feature space for these machine learning models includes 40 features with each ground truth pixel, created from the digitalization, comes along with 40 features: 11 Band values, that are referring to Rayleigh corrected reflectance; 9 indices concerning the sea surface (surface (Normalized Difference Water Index (NDWI), Normalised Difference Vegetation Index (NDVI), Modified Normalized Difference Water Index (MNDWI), Snow Water Index (SWI), Tur_Nechad2016, Tur_Dogliotti, Normalized Difference Chlorophyll Index (NDCI), Floating Algae Index (FAI), and Tur_Nechad2016, Tur_Dogliotti and ch_re_bramich); and 20 texture indices per band (Gaussian_blur, sobel, hessian, df_gaussians, membrane_prjs, mean, var, median, min, max, anisotropic_diff, bilateral, lipschitz, kuwahara, gabor, derivatives, Laplacian, structure filter, entropy, neighbors). These same features were used in the type identification. Data from the SAR satellites processed by the machine learning models of the prototype of the volume estimation module 146 include oil slicks expansions caused by the oil spill. Data from the multispectral satellites processed by the machine learning models of the prototype of the volume estimation module 146 include reflection/absorption features of different regions of electromagnetic spectrum. Data from the historic oil spills processed by the machine learning models of the prototype of the volume estimation module 146 include date and time of the oil spill, geographical location and extend of the spill, type of the oil, and spilled volume.

The monitoring process includes obtaining satellite images of the body of water for a first time period and a second time period (step 222). The machine learning models of the volume estimation module 146 determine one or more features to extract from the images (step 224). These features represent physical features of a surface of the body of water for each of the first time period and the second time period. The features are extracted from the images to form a first feature vector for the first time period and a second feature vector for the second time period (step 226).

The volume estimation module 146 includes one or machine learning models trained with labeled image data representing instances of oil on the surface of the body of water in the historic spill data. The labeled image data associates the appearance of oil (e.g., sheen, rainbow, metallic, discontinuous true oil, and continuous true oil) with portions of the surface of the water body based on the respective instances of the oil in the first and second vectors. Although the prototype of the volume estimation module 146 was trained on data from the Arabian Gulf, the volume estimation module 146 can be trained on data from other bodies of water. The prototype volume estimation module 146 delivers classified images with type of oil in which each pixel has a specific number that describes the thematic class. Each pixel also has an estimation regarding confidence in the detection.

The prototype volume estimation module 146 follows the Bonn Agreement of Oil Appearance Code (BAOAC), in which an appearance code has been developed free from specific color names as oil cannot be characterized purely in terms of apparent color. The BAOAC categories were developed to describe the relationship between the appearance of the oil layer and its thickness. Crude oil and other fuels that are accidentally discharged on the sea surface endure with multiple physical processes that change the thickness of the oil, and, accordingly, its appearance. Due to the weathering processes, the thickness of the oil can increase and transform into a thicker emulsion, as a result of wave actions, photo-oxidation and evaporation. The BAOAC coding provides five oil-thickness related classes: sheens (silver/gray)—a light layer of floating oil of silvery color; rainbow—a slightly thicker layer that reflects colors; metallic—a thicker layer than the rainbow that tends to reflect the color of the sky, appearing from light gray to a dull brown; discontinuous true oil color—an oil-on-water thick layer that tends to appear brown; and continuous true oil color—a continuous true oil color that occurs at oil thicknesses of at least hundreds of micrometers.

The volume estimation module 146 selects a specific machine learning model based on the one or more features included in the first feature vector and the second feature vector. The selected machine learning model processes the first feature vector and the second feature vector (step 228) and determines, based on the processing, areas of the body of water associated with each oil appearance code (step 230). In some systems, determining areas of the body of water associated with each oil appearance code includes determining a number of pixels of the image associated each oil appearance code and determining an area with each pixel of the image.

Each oil appearance code is associated with a thickness of oil. In some systems, determining volumes of oil in the body of water comprises, for each oil appearance code, summing the area of pixels associated with that oil appearance code times the thickness of oil associated with that oil appearance code. The product of the areas associated with an oil appearance code times the thickness of oil associated with the oil appearance code provides an estimate of the volume of oil associated with the oil appearance code. The sum of estimates for all the oil appearance codes can provide an estimate of the total volume of oil spilled.

The results of this process are stored in the first data store 150 in association with the image (step 232).

The appearance and volume of oil determined by the volume estimation module 146 can be assessed to help determine where deployment of remediation assets will have the most significant impact. In addition, the type and location of oil, optionally, can be the basis for sending instructions to remediation assets (e.g., oil spill response vessels) in the body of water (step 236).

Although the described volume estimation module 146 uses data from both SAR and multispectral satellites, some identification modules use only a single type of satellite images (i.e., SAR images or multispectral images but not both). In identification modules that use both SAR images and multispectral images, the process of determining the location of oil can be performed using SAR images and, the process of determining type and location of oil can be performed using multispectral images.

Figure 6:
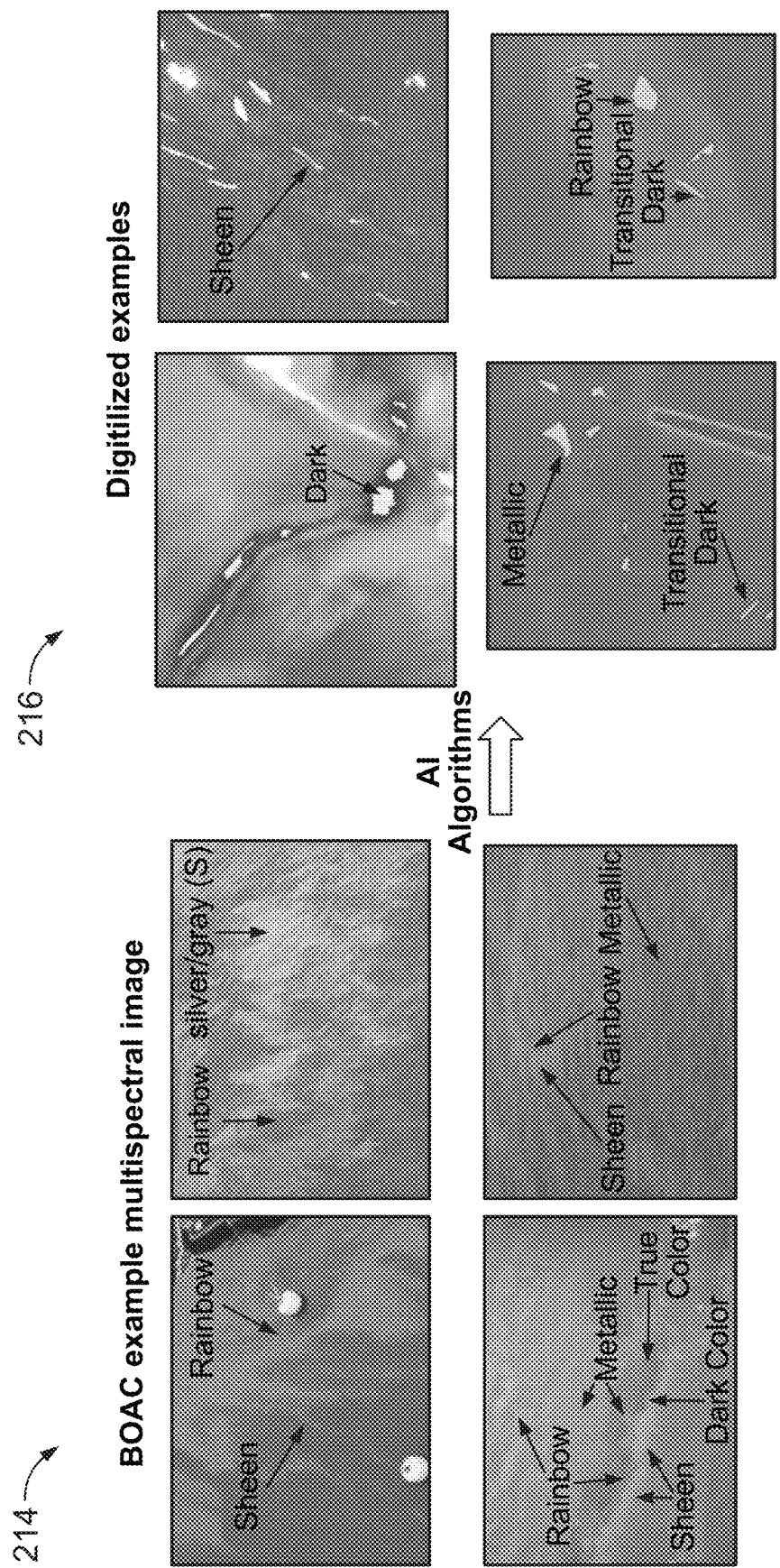
FIG. 6 illustrates results generated by a prototype of a volume estimation module.

FIG. 6 illustrates input to (e.g., multispectral satellite images 214) and results (e.g., digitized images with areas of specific sheens identified) generated by a prototype of a volume estimation module.

Tracking Oil Spills

Figure 7:
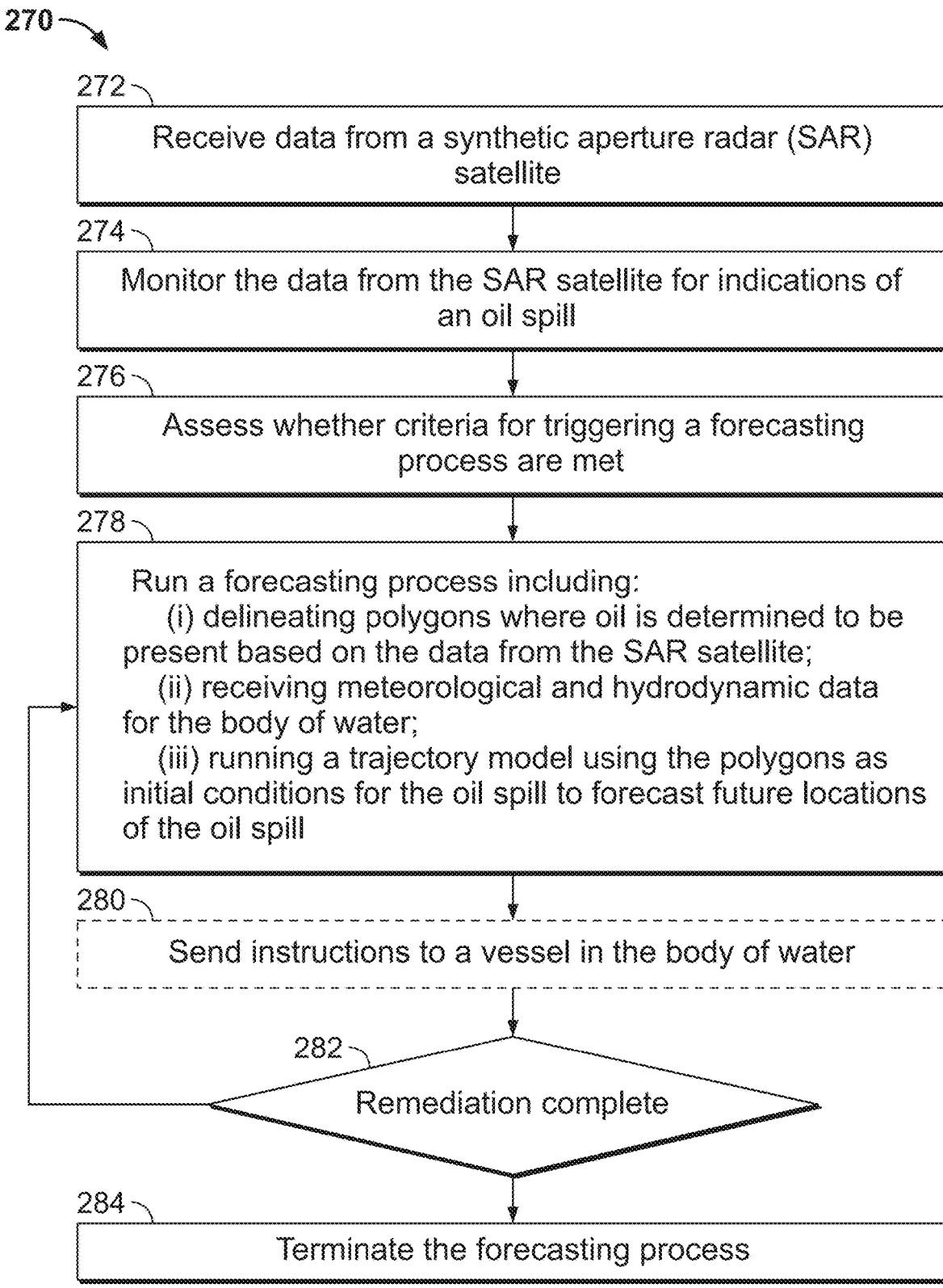
FIG. 7 illustrates an example flow diagram for a trajectory forecasting module of the system of FIG. 2.

FIG. 7 illustrates an example flow diagram for a trajectory forecasting module of the system of FIG. 2. A method 270 for tracking and remediating oil in a body of water includes receiving, by a processor, data from a synthetic aperture radar satellite (step 272). As discussed above, the trajectory forecasting module 148 is activated when trigger criteria (e.g., criteria associated with the volume or location of oil) are exceeded. Monitoring the data from the synthetic aperture radar satellite for indications of an oil spill (step 274) can be performed, for example, using the identification module 144 and the volume estimation module 146 already described. Currently, the oil spill trajectories are predicted based on spill information from the facilities/personal assigned for monitoring the spills. This potentially result in unnoticed spills in the remote locations and cause a delay in response towards the emergencies. In addition, this current practice of trajectory prediction is based on spill information from single source point. The spatial information available after the occurrence of oil spill are not generally incorporated into the trajectory prediction system which often overlook the impacted areas.

When the processor determining that the indications of oil spill are present, the processor assesses whether criteria for triggering a forecasting process are met (step 276). Assessing whether criteria for triggering a forecasting process are met can include assessing the size and location of the oil spill (e.g., estimating an areal extent of the oil spill and/or assessing size of the oil spill comprising estimating a volume of the oil spill).

When criteria for triggering a forecasting process have been met, an oil spill trajectory model is run (step 278). Polygons are delineated where oil is determined to be present based on the data from the synthetic aperture radar satellite. If an oil spill is detected by on SAR images, trajectory prediction is based on available information (e.g., location). If a multispectral image is available (or when it is available), the trajectory predicts/updates with other information (e.g., location, type, and volume).

These polygons are used as initial conditions for the oil spill trajectory model. The oil spill trajectory model also receives and uses meteorological and hydrodynamic data for the body of water to forecast where the oil spill will move. The predictions of the oil spill trajectory model can be used to guide remediation efforts including, optionally, sending instructions to a vessel in the body of water (step 280).

At periodic intervals, whether remediation efforts are complete is assessed (step 282). If remediation efforts are complete, the forecasting process is terminated (step 284). If remediation efforts are not complete, the availability of updated synthetic aperture radar data for the body of water is checked. The checking of updated synthetic aperture radar data available for the body of water can be performed at time intervals based on the meteorological and hydrodynamic data for the body of water. If updated synthetic aperture radar data is available for the body of water, delineating, receiving, running, and assessing steps are repeated.

Figure 8:
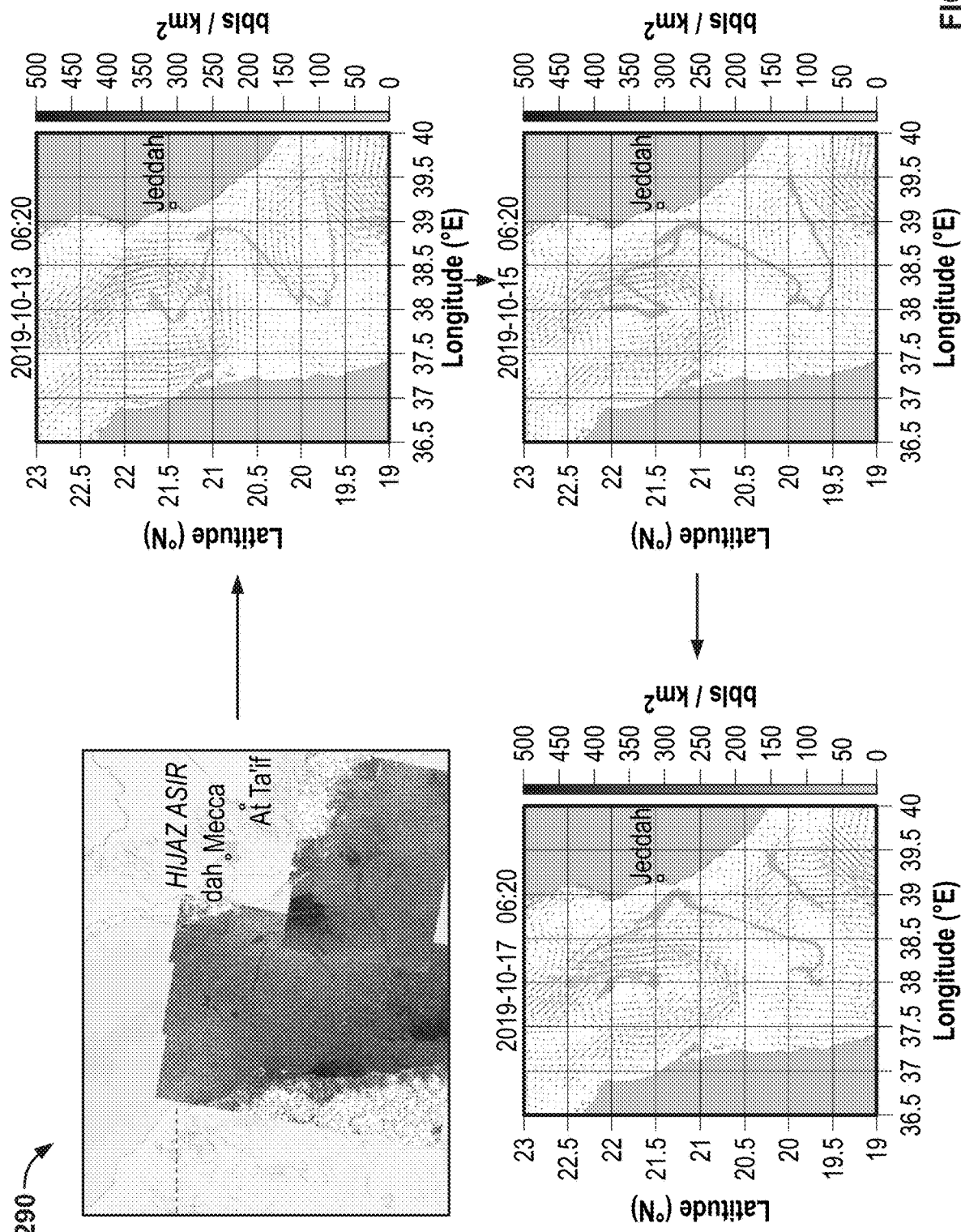
FIG. 8 illustrates results generated by a prototype of trajectory forecasting module.

FIG. 8 illustrates results 290 generated by a prototype of trajectory forecasting module.

Figure 9:
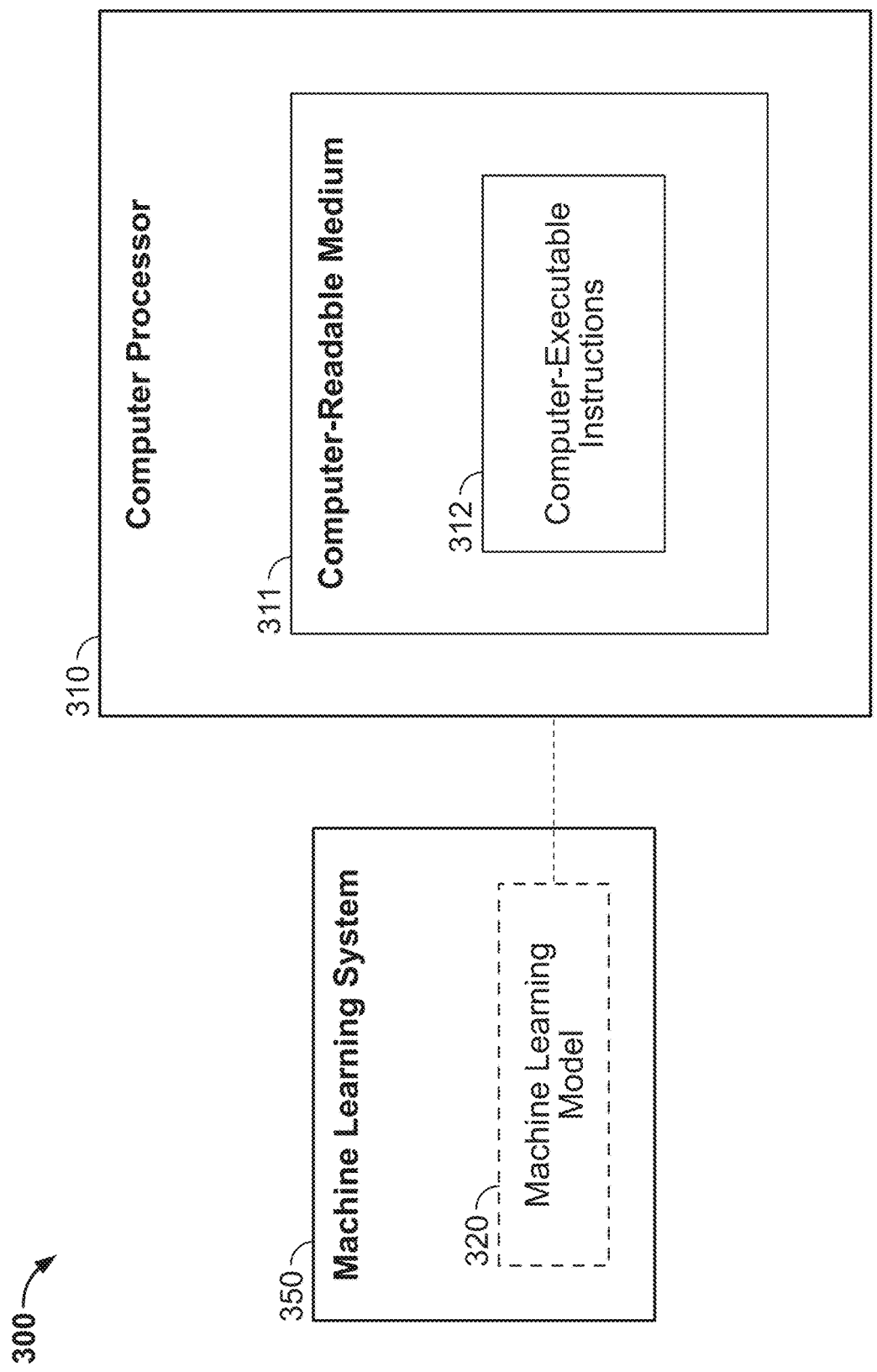
FIG. 9 is a diagram illustrating an example computer system 300 configured to execute a machine learning model.

FIG. 9 is a diagram illustrating an example computer system 300 configured to execute a machine learning model. Generally, the computer system 300 is configured to process data indicating type of oil and the appearance of oil. The system 300 includes computer processors 310. The computer processors 310 include computer-readable memory 311 and computer readable instructions 312. The system 300 also includes a machine learning system 350. The machine learning system 350 includes a machine learning model 320. The machine learning model 320 can be separate from or integrated with the computer processors 310.

The computer-readable medium 311 (or computer-readable memory) can include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. In an embodiment, the computer-readable medium 311 includes code-segment having executable instructions.

In some implementations, the computer processors 310 include a general purpose processor. In some implementations, the computer processors 310 include a central processing unit (CPU). In some implementations, the computer processors 310 include at least one application specific integrated circuit (ASIC). The computer processors 310 can also include general purpose programmable microprocessors, graphic processing units, special-purpose programmable microprocessors, digital signal processors (DSPs), programmable logic arrays (PLAs), field programmable gate arrays (FPGA), special purpose electronic circuits, etc., or a combination thereof. The computer processors 310 are configured to execute program code means such as the computer-executable instructions 312 and configured to execute executable logic that includes the machine learning model 320.

The computer processors 310 are configured to receive data including: 11 Band values, that are referring to Rayleigh corrected reflectance; 9 indices concerning the sea surface (Normalized Difference Water Index (NDWI), Normalised Difference Vegetation Index (NDVI), Modified Normalized Difference Water Index (MNDWI), Snow Water Index (SWI), Normalized Difference Chlorophyll Index (NDCI), Floating Algae Index (FAI), and Tur_Nechad2016, Tur_Dogliotti and ch_re_bramich); and 20 texture indices per band (Gaussian_blur, sobel, hessian, df_gaussians, membrane_prjs, mean, var, median, min, max, anisotropic_diff, bilateral, lipschitz, kuwahara, gabor, derivatives, Laplacian, structure filter, entropy, neighbors).

The machine learning model 320 of the identification module 144 is capable of processing the data to determine specific types of oil present on the surface of a body of water. The machine learning model 320 of the volume estimation module 146 is capable of processing the data to determine the appearance of oil on a body of water.

The machine learning system 350 is capable of applying machine learning techniques to train the machine learning model 320. As part of the training of the machine learning model 320, the machine learning system 350 forms a training set of input data by identifying a positive training set of input data items that have been determined to have the property in question, and, in some embodiments, forms a negative training set of input data items that lack the property in question.

The machine learning system 350 extracts feature values from the input data of the training set, the features being variables deemed potentially relevant to whether or not the input data items have the associated property or properties. An ordered list of the features for the input data is herein referred to as the feature vector for the input data. In one embodiment, the machine learning system 350 applies dimensionality reduction (e.g., via linear discriminant analysis (LDA), principle component analysis (PCA), or the like) to reduce the amount of data in the feature vectors for the input data to a smaller, more representative set of data.

In some implementations, the machine learning system 350 uses supervised machine learning to train the machine learning models 320 with the feature vectors of the positive training set and the negative training set serving as the inputs. Different machine learning techniques-such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The machine learning model 320, when applied to the feature vector extracted from the input data item, outputs an indication of whether the input data item has the property in question, such as a Boolean yes/no estimate, or a scalar value representing a probability.

In some embodiments, a validation set is formed of additional input data, other than those in the training sets, which have already been determined to have or to lack the property in question. The machine learning system 350 applies the trained machine learning model 320 to the data of the validation set to quantify the accuracy of the machine learning model 320. Common metrics applied in accuracy measurement include: Precision=TP/(TP+FP) and Recall=TP/(TP+FN), where precision is how many the machine learning model correctly predicted (TP or true positives) out of the total it predicted (TP+FP or false positives), and recall is how many the machine learning model correctly predicted (TP) out of the total number of input data items that did have the property in question (TP+FN or false negatives). The F score (F-score=2*PR/(P+R)) unifies precision and recall into a single measure. In one embodiment, the machine learning module iteratively re-trains the machine learning model until the occurrence of a stopping condition, such as the accuracy measurement indication that the model is sufficiently accurate, or a number of training rounds having taken place.

In some implementations, the machine learning model 320 is a convolutional neural network (CNN). A CNN can be configured based on a presumption that inputs to the CNN correspond to image pixel data for an image or other data that includes features at multiple spatial locations. For example, sets of inputs can form a multi-dimensional data structure, such as a tensor, that represent color features of an example digital image (e.g., a biological image of biological tissue). In some implementations, inputs to the CNN correspond to a variety of other types of data, such as data obtained from different devices and sensors of a vehicle, point cloud data, audio data that includes certain features or raw audio at each of multiple time steps, or various types of one-dimensional or multiple dimensional data. A convolutional layer of the CNN can process the inputs to transform features of the image that are represented by inputs of the data structure. For example, the inputs are processed by performing dot product operations using input data along a given dimension of the data structure and a set of parameters for the convolutional layer.

Performing computations for a convolutional layer can include applying one or more sets of kernels to portions of inputs in the data structure. The manner in which CNN performs the computations can be based on specific properties for each layer of an example multi-layer neural network or deep neural network that supports deep neural net workloads. A deep neural network can include one or more convolutional towers (or layers) along with other computational layers. In particular, for example computer vision applications, these convolutional towers often account for a large proportion of the inference calculations that are performed. Convolutional layers of a CNN can have sets of artificial neurons that are arranged in three dimensions, a width dimension, a height dimension, and a depth dimension. The depth dimension corresponds to a third dimension of an input or activation volume and can represent respective color channels of an image. For example, input images can form an input volume of data (e.g., activations), and the volume has dimensions 32×32×3 (width, height, depth respectively). A depth dimension of 3 can correspond to the RGB color channels of red (R), green (G), and blue (B).

In general, layers of a CNN are configured to transform the three dimensional input volume (inputs) to a multi-dimensional output volume of neuron activations (activations). For example, a 3D input structure of 32×32×3 holds the raw pixel values of an example image, in this case an image of width 32, height 32, and with three color channels, R,G,B. A convolutional layer of a CNN of the machine learning model 320 computes the output of neurons that may be connected to local regions in the input volume. Each neuron in the convolutional layer can be connected only to a local region in the input volume spatially, but to the full depth (e.g., all color channels) of the input volume. For a set of neurons at the convolutional layer, the layer computes a dot product between the parameters (weights) for the neurons and a certain region in the input volume to which the neurons are connected. This computation may result in a volume such as 32×32×12, where 12 corresponds to a number of kernels that are used for the computation. A neuron's connection to inputs of a region can have a spatial extent along the depth axis that is equal to the depth of the input volume. The spatial extent corresponds to spatial dimensions (e.g., x and y dimensions) of a kernel.

A set of kernels can have spatial characteristics that include a width and a height and that extends through a depth of the input volume. Each set of kernels for the layer is applied to one or more sets of inputs provided to the layer. That is, for each kernel or set of kernels, the machine learning model 320 can overlay the kernel, which can be represented multi-dimensionally, over a first portion of layer inputs (e.g., that form an input volume or input tensor), which can be represented multi-dimensionally. For example, a set of kernels for a first layer of a CNN may have size 5×5×3×16, corresponding to a width of 5 pixels, a height of 5 pixel, a depth of 3 that corresponds to the color channels of the input volume to which to a kernel is being applied, and an output dimension of 16 that corresponds to a number of output channels. In this context, the set of kernels includes 16 kernels so that an output of the convolution has a depth dimension of 16.

The machine learning model 320 can then compute a dot product from the overlapped elements. For example, the machine learning model 320 can convolve (or slide) each kernel across the width and height of the input volume and compute dot products between the entries of the kernel and inputs for a position or region of the image. Each output value in a convolution output is the result of a dot product between a kernel and some set of inputs from an example input tensor. The dot product can result in a convolution output that corresponds to a single layer input, e.g., an activation element that has an upper-left position in the overlapped multi-dimensional space. As discussed above, a neuron of a convolutional layer can be connected to a region of the input volume that includes multiple inputs. The machine learning model 320 can convolve each kernel over each input of an input volume. The machine learning model 320 can perform this convolution operation by, for example, moving (or sliding) each kernel over each input in the region.

The machine learning model 320 can move each kernel over inputs of the region based on a stride value for a given convolutional layer. For example, when the stride is set to 1, then the machine learning model 320 can move the kernels over the region one pixel (or input) at a time. Likewise, when the stride is 2, then the machine learning model 320 can move the kernels over the region two pixels at a time. Thus, kernels may be shifted based on a stride value for a layer and the machine learning model 320 can repeatedly perform this process until inputs for the region have a corresponding dot product. Related to the stride value is a skip value. The skip value can identify one or more sets of inputs (2×2), in a region of the input volume, that are skipped when inputs are loaded for processing at a neural network layer. In some implementations, an input volume of pixels for an image can be "padded" with zeros, e.g., around a border region of an image. This zero-padding is used to control the spatial size of the output volumes.

As discussed previously, a convolutional layer of CNN is configured to transform a three dimensional input volume (inputs of the region) to a multi-dimensional output volume of neuron activations. For example, as the kernel is convolved over the width and height of the input volume, the machine learning model 320 can produce a multi-dimensional activation map that includes results of convolving the kernel at one or more spatial positions based on the stride value. In some cases, increasing the stride value produces smaller output volumes of activations spatially. In some implementations, an activation can be applied to outputs of the convolution before the outputs are sent to a subsequent layer of the CNN.

An example convolutional layer can have one or more control parameters for the layer that represent properties of the layer. For example, the control parameters can include a number of kernels, K, the spatial extent of the kernels, F, the stride (or skip), S, and the amount of zero padding, P.

Numerical values for these parameters, the inputs to the layer, and the parameter values of the kernel for the layer shape the computations that occur at the layer and the size of the output volume for the layer. In some implementations, the spatial size of the output volume is computed as a function of the input volume size, W, using the formula (W?F+2P)/S+1. For example, an input tensor can represent a pixel input volume of size [227×227×3]. A convolutional layer of a CNN can have a spatial extent value of F=11, a stride value of S=4, and no zero-padding (P=0). Using the above formula and a layer kernel quantity of K=96, the machine learning model 320 performs computations for the layer that results in a convolutional layer output volume of size [55×55×96], where 55 is obtained from [(227−11+0)/4+1=55].

The computations (e.g., dot product computations) for a convolutional layer, or other layers, of a CNN involve performing mathematical operations, e.g., multiplication and addition, using a computation unit of a hardware circuit of the machine learning model 320. The design of a hardware circuit can cause a system to be limited in its ability to fully utilize computing cells of the circuit when performing computations for layers of a neural network.

Figure 10:
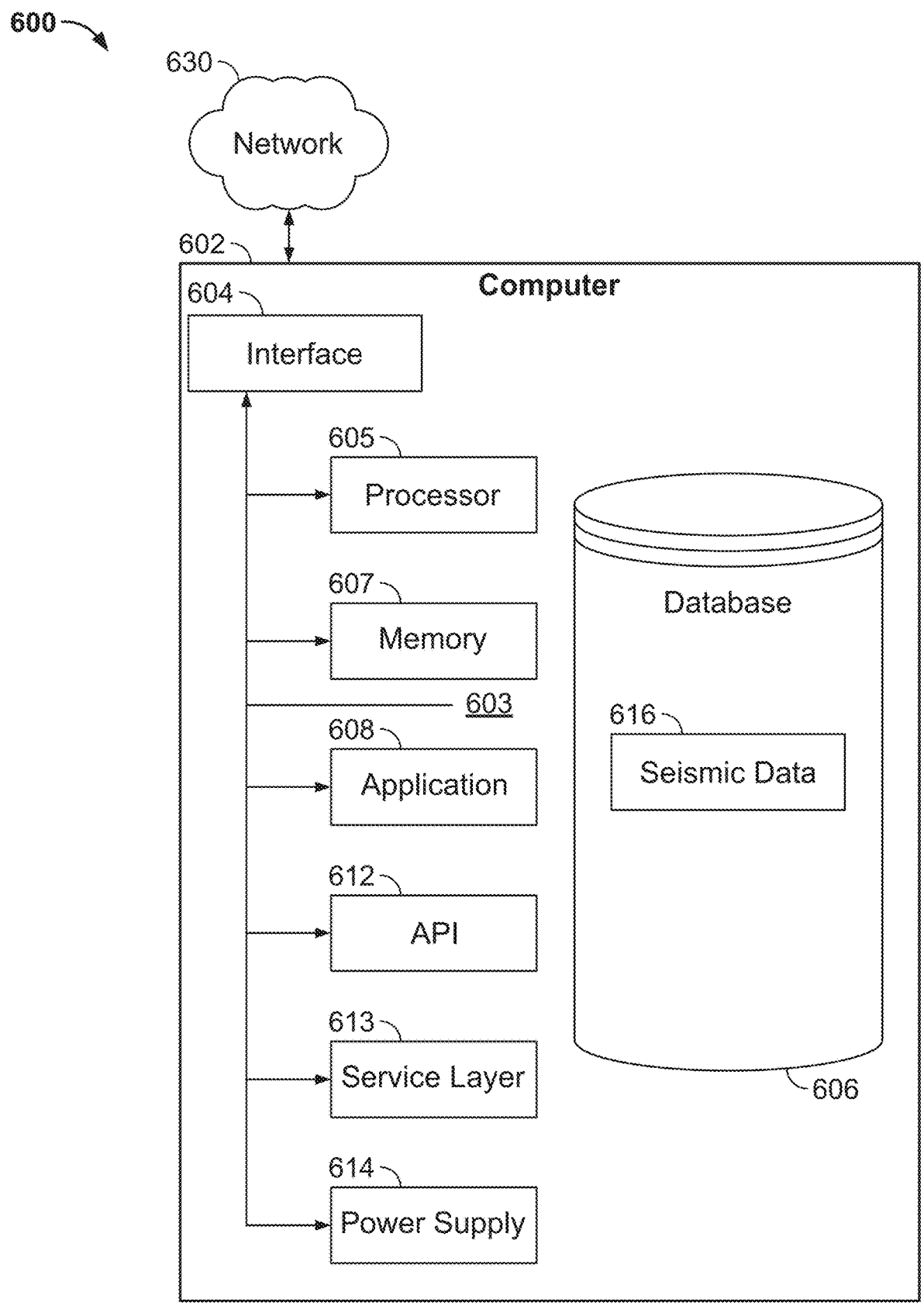
FIG. 10 is a block diagram illustrating an example computer system used to provide computational functionalities associated with described algorithms, methods, functions, processes, flows, and procedures according to some implementations of the present disclosure.

FIG. 10 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases)

according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method for identifying an oil spill in a body of water, the method comprising:
   (a) obtaining an image of the body of water from a satellite for a first time period and a second time period;
   (b) determining one or more features to extract from the image, the one or more features representing a physical feature of a surface of the body of water for each of the first time period and the second time period;
   (c) extracting the one or more features from the image to form a first feature vector for the first time period and a second feature vector for the second time period;
   (d) processing the first feature vector and the second feature vector using a machine learning model, the machine learning model being trained with labeled image data representing instances of oil on the surface of the body of water, the labeled image data associating types of the oil with portions of the surface of a given body of water based on respective instances of the oil represented in the first feature vector and the second feature vector, wherein the first feature vector and the second feature vector include reflection features, absorption features, or both reflection and absorption features corresponding to different regions of electromagnetic spectrum, the reflection and absorption features associated with types of oil in the labeled image data;
   (e) determining, based on the processing, the type and location of oil in the body of water; and
   (f) storing, in a data store, the type and locations of oil in the body of water in association with the image.

2. The method of claim 1, wherein obtaining the image of the body of water from the satellite comprises obtaining a synthetic aperture radar image, a multispectral image, or both.

3. The method of claim 2, wherein obtaining the image of the body of water from the satellite comprises obtaining both the synthetic aperture radar image and the multispectral image and performing steps (b)-(f) on the synthetic aperture radar image and the multispectral image.

4. The method of claim 3 further comprising: comparing the locations of oil determined based on the synthetic aperture radar image with the locations of oil determined based on the multispectral image to assess whether an oil spill has occurred.

5. The method of claim 1, wherein the types of oil include Arabian Heavy, Arabian Medium, Arabian Light, Arabian Extra Light, and Arabian Super Light.

6. The method of claim 1, further comprising assessing the type and location of oil in the body of water to identify possible sources of the oil.

7. The method of claim 1 further comprising sending instructions to at least one vessel in the body of water based on stored locations of oil in the body of water.

8. A system for identifying an oil spill in a body of water, the system comprising:
   at least one processor; and
   a memory storing instructions that, when executed by the at least one processor, cause the at least one processor to perform operations comprising:
   (a) obtaining an image of the body of water from a satellite for a first time period and a second time period;
   (b) determining one or more features to extract from the image, the one or more features representing a physical feature of a surface of the body of water for each of the first time period and the second time period;
   (c) extracting the one or more features from the image to form a first feature vector for the first time period and a second feature vector for the second time period;
   (d) processing the first feature vector and the second feature vector using a machine learning model trained with labeled image data representing instances of oil on the surface of the body of water, the labeled image data associating types of the oil with portions of the surface of a given body of water based on respective instances of the oil represented in the first feature vector and the second feature vector, wherein the first feature vector and the second feature vector include reflection features, absorption features, or both reflection and absorption features corresponding to different regions of electromagnetic spectrum, the reflection and absorption features associated with types of oil in the labeled image data;

(e) determining, based on the processing, the type and location of oil in the body of water; and (f) storing, in a data store, the type and locations of oil in the body of water in association with the image.

9. The system of claim 8, wherein obtaining the image of the body of water from the satellite comprises obtaining a synthetic aperture radar image, a multispectral image, or both.

10. The system of claim 9, wherein obtaining the image of the body of water from the satellite comprises obtaining both the synthetic aperture radar image and the multispectral image and further comprising performing steps (b)-(f) on the synthetic aperture radar image and the multispectral image.

11. The system of claim 10, the operations further comprising: comparing the locations of oil determined based on the synthetic aperture radar image with the locations of oil determined based on the multispectral image to assess whether an oil spill has occurred.

12. The system of claim 8, wherein the types of oil include Arabian Heavy, Arabian Medium, Arabian Light, Arabian Extra Light, and Arabian Super Light.

13. The system of claim 8, the operations further comprising assessing the type and location of oil in the body of water to identify possible sources of the oil.

14. The system of claim 8, the operations further comprising sending instructions to at least one vessel in the body of water based on stored locations of oil in the body of water.

15. One or more non-transitory computer readable media storing instructions for identifying an oil spill in a body of water, the instructions, when executed by at least one processor, configured to cause the at least one processor to perform operations comprising:

(a) obtaining an image of the body of water from a satellite for a first time period and a second time period;

(b) determining one or more features to extract from the image, the features representing a physical feature of a surface of the body of water for each of the first time period and the second time period;

(c) extracting the one or more features from the image to form a first feature vector for the first time period and a second feature vector for the second time period;

(d) processing the first feature vector and the second feature vector using a machine learning model, the machine learning model being trained with labeled image data representing instances of oil on the surface of the body of water, the labeled image data associating types of the oil with portions of the surface of a given body of water based on respective instances of the oil represented in the first feature vector and the second feature vector, wherein the first feature vector and the second feature vector include reflection features, absorption features, or both reflection and absorption features corresponding to different regions of electromagnetic spectrum, the reflection and absorption features associated with types of oil in the labeled image data;

(e) determining, based on the processing, the type and location of oil in the body of water; and (f) storing, in a data store, the type and locations of oil in the body of water in association with the image.

16. The one or more non-transitory computer readable media of claim 15, wherein obtaining the image of the body of water from the satellite comprises obtaining a synthetic aperture radar image, a multispectral image, or both.

17. The one or more non-transitory computer readable media of claim 16, wherein obtaining the image of the body of water from the satellite comprises obtaining both the synthetic aperture radar image and the multispectral image and performing steps (b)-(f) on the synthetic aperture radar image and the multispectral image.

18. The one or more non-transitory computer readable media of claim 17, the operations further comprising: comparing the locations of oil determined based on the synthetic aperture radar image with the locations of oil determined based on the multispectral image to assess whether an oil spill has occurred.

19. The one or more non-transitory computer readable media of claim 15, wherein the types of oil include Arabian Heavy, Arabian Medium, Arabian Light, Arabian Extra Light, and Arabian Super Light.

20. The one or more non-transitory computer readable media of claim 15, the operations further comprising assessing the type and location of oil in the body of water to identify possible sources of the oil.

* * * * *